US008229488B2

(12) United States Patent
Siotis

(10) Patent No.: US 8,229,488 B2
(45) Date of Patent: Jul. 24, 2012

(54) METHODS, APPARATUSES AND COMPUTER PROGRAMS FOR MEDIA CONTENT DISTRIBUTION

(75) Inventor: Georg Siotis, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 432 days.

(21) Appl. No.: 12/512,356

(22) Filed: Jul. 30, 2009

(65) Prior Publication Data

US 2011/0028083 A1 Feb. 3, 2011

(51) Int. Cl.
*H04B 7/00* (2006.01)
(52) U.S. Cl. .................. 455/518; 455/519; 455/90.2
(58) Field of Classification Search .......... 455/517–520, 455/553.1, 90.2, 78, 79, 500, 426.1, 412.1, 455/414.1, 416, 420; 370/352, 389, 338, 370/328
See application file for complete search history.

(56) References Cited

U.S. PATENT DOCUMENTS

| 7,236,465 | B2 * | 6/2007 | Banerjee et al. | 370/312 |
|---|---|---|---|---|
| 2002/0078154 | A1 * | 6/2002 | Djennane et al. | 709/205 |
| 2003/0134655 | A1 * | 7/2003 | Chen et al. | 455/522 |
| 2005/0122929 | A1 * | 6/2005 | Zuniga | 370/328 |
| 2006/0096755 | A1 * | 5/2006 | Zupanick | 166/268 |
| 2006/0098237 | A1 * | 5/2006 | Steinberg et al. | 358/302 |
| 2007/0180537 | A1 * | 8/2007 | He et al. | 726/32 |
| 2007/0243821 | A1 * | 10/2007 | Hundscheidt et al. | 455/3.04 |
| 2007/0293145 | A1 * | 12/2007 | Yahagi | 455/3.01 |
| 2008/0189301 | A1 * | 8/2008 | Chen et al. | 707/100 |
| 2009/0104925 | A1 * | 4/2009 | Aula | 455/466 |
| 2009/0109868 | A1 * | 4/2009 | Chen et al. | 370/254 |
| 2009/0288150 | A1 * | 11/2009 | Toomim et al. | 726/5 |
| 2010/0199338 | A1 * | 8/2010 | Craddock et al. | 726/7 |
| 2011/0276396 | A1 * | 11/2011 | Rathod | 705/14.49 |

FOREIGN PATENT DOCUMENTS

| WO | 01/47210 A2 | 6/2001 |
|---|---|---|
| WO | 2008/085133 A1 | 7/2008 |
| WO | WO 2008/085133 | 7/2008 |

OTHER PUBLICATIONS

International Search Report, corresponding to PCT/EP2010/051115, mailed on Jun. 7, 2010.
Written Opinion of the International Searching Authority, corresponding to PCT/EP2010/051115, mailed on Jun. 7, 2010.
Clawson, J. et al; "Mobiphos: A collocated-synchronous mobile photo sharing application"; MOBILEHCI 2008—Proceedings of the 10th International Conference on Human-Computer Interaction With Mobile Devices and Services—(Sep. 2, 2008), pp. 187-195 XP002583403.

(Continued)

*Primary Examiner* — Dominic E Rego
(74) *Attorney, Agent, or Firm* — Renner, Otto, Boisselle & Sklar, LLP

(57) ABSTRACT

Methods for distributing media content between portable electronic devices enabled for media acquisition and wireless communication are disclosed. The methods comprises forming of a group of the portable electronic devices being present at a common context, providing a piece of media content to other members of the group, and collecting a piece of media content from other members of the group, respectively. Apparatuses, i.e. portable electronic devices, suitable for such media content distribution, as computer programs for implementing the media content distribution on such apparatuses, are also disclosed.

24 Claims, 5 Drawing Sheets

OTHER PUBLICATIONS

Anonymous: System and Method for Sharing Digital Photographs Over a Wireless Network: IP.COM Journal, IP.COM Inc., West Henrietta, NY, US, Jul. 9, 2007, XP013121210 ISSN; 1533-0001, the whole document.

Bin Wang et al: "Supporting persistent social groups in ubiquitous computing environments using context-aware ephemeral group service" Pervasive Computing and Communications, 2004. Proceedings of the Second IEEE Annual Conference on Mar. 14-17, 2004, Piscataway, NJ, USA, IEEE, Mar. 14, 2004, pp. 287-296, XP010689691 ISBN: 978-0-7695-2090-2, sections 1.2, 2.2.

Kohno M., Rekimoto J.: Searching Common Experience: A Social Communication Tool Based on Mobile Ad-hoc Networking: Proceedings of the 7$^{th}$ International Conference on Human Computer Interaction with Mobile Devices & Services, 2005, Mobile HCI '05, Salzburg, ATX, Sep. 19, 2005, pp. 15-22, XP002583404 ISBN: 1-59593-089-2, Sections 3.1, 4., 5, 7.

Jisun An et al: "A social relation aware routing protocol for mobile ad hoc networks": Pervasive Computing and Communications, 2009. IEEE International Conference on, IEEE, Piscataway, NJ, USA LNKD—DOI: 10.1109/PERCOM.2009.4912879, Mar. 9, 2009, pp. 1-6, XP031453217 ISBN: 978-1-4244-3304-9, sections I., III., IV.

\* cited by examiner

METHODS, APPARATUSES AND COMPUTER PROGRAMS FOR MEDIA CONTENT DISTRIBUTION

TECHNICAL FIELD

The present invention relates to methods, apparatuses and computer programs for media content distribution among a group of portable electronic devices sharing a common context.

BACKGROUND

A group of people attending an event or travelling together share the memories of a moment in life. The memories are many times supported by documentation such a photos or video recordings. One thing about this is that the one taking the photos is mostly not present on the pictures. Another thing is that different people see different things to capture on photo or video. Portable electronic apparatuses, such as digital cameras and mobile telephones having digital camera function, are often brought everywhere by everybody nowadays, crudely expressed. Therefore, on an occasion as this, a lot of different documentation is normally made when considering that many of the participants each make a few shots. After the event or travel, some may send copies to the others of their photos or video clips. With digital photos or video clips, this can be made via email or any other messaging service. However, this requires an extra effort and has to be remembered to be done afterwards. Thus, there can be considered a problem of sharing captured memories, i.e. pictures and video clips, with others that have shared the moment when these were acquired.

SUMMARY

Today it is very common with portable electronic apparatuses have both the ability to capture media, such as picture and/or video, and communicate wirelessly. It may be a mobile phone with camera capabilities or a camera with wireless communication capabilities. The wireless capabilities that are used are for example Bluetooth Wireless Technology or any of the Wireless Local Area Network technologies. These technologies can be arranged to work according to an ad hoc approach. The invention is based on the understanding that the above elucidated technical features can be utilized for solving the above stated problem of sharing captured memories, i.e. pictures and video clips, with others that have shared the moment when these were acquired.

According to a first aspect, there is provided a method for distributing media content between portable electronic devices enabled for media acquisition and wireless communication. The method comprises joining, by a first portable electronic device, a group of the portable electronic devices being present at a common context; identifying a piece of media content acquired by the first portable electronic device within the common context and not yet distributed within the group; establishing a connection between the first portable electronic device and at least one other portable electronic device of the portable electronic devices of the group via a wireless communication channel; and transferring the piece of media content via the connection to the at least one other portable electronic device of the portable electronic devices of the group.

The common context may be defined by at least one of a common event and a common time period.

The method may further comprise excluding one of the portable electronic device of the group from the group when that portable electronic device fails to share the common context.

The method may further comprise, when joining the group, exchanging an access code within the group, wherein the first portable electronic device is included in the group upon provision of the correct access code.

The piece of media content may comprise any of a photo taken by the first portable electronic device and a video clip recorded by the first portable electronic device.

The identifying of the piece of media content may further comprise identifying a piece of media content collected by the first portable electronic device from another portable electronic apparatus of the group such that the collected piece of media content is re-distributed within the group by the establishing of a connection and the transferring.

The establishing of the connection may comprise any of direct wireless contact to at least one of the portable electronic devices of the group and relaying within the portable electronic devices of the group.

The establishing of the connection may comprise only direct wireless contact to the portable electronic devices of the group.

The method may further comprise holding an information field associated with each piece of media content, the information field comprising information on which of the portable devices of the group the piece of media content has been distributed to.

The method may further comprise defining a set of distribution effort criteria comprising at least one distribution effort criterion including any of a group comprising a maximum time period until successful distribution to distribute to a receiving party among the portable electronic devices of the group, a maximum proximity value to a receiving party among the portable electronic devices of the group defined by number of relaying steps, a maximum proximity value to a receiving party among the portable electronic devices of the group based on geographical information, and a maximum number of attempts until successful distribution to distribute to a receiving party among the portable electronic devices of the group, wherein distribution efforts are ended if the distribution effort criteria set is exceeded. The distribution efforts may be ended if one of the at least one distribution effort criterion of the distribution effort criteria set is exceeded.

The method may further comprise providing a sharing awareness indication to a user of the first portable electronic device. The sharing awareness indication may include a symbol presented on a display of the first portable electronic device. The sharing awareness indication may include providing a question to the user of the first portable electronic device whether a piece of media content should be shared, and if a received answer is affirmative, sharing the piece of media content, or if the received answer is negative, excluding the piece of media content from sharing.

According to a second aspect, there is provided a method for collecting media content among portable electronic devices being present at a common context and being enabled for multimedia acquisition and wireless communication. The method comprises joining, by a first portable electronic device, the group of the portable electronic devices; receiving, by the first portable electronic device, a request for connection from one of the portable electronic devices of the group, the request being related to offering a piece of media content; establishing the connection between the first portable electronic device and the one of the portable electronic devices of the portable electronic devices of the group via a wireless communication channel; and receiving, by the first portable electronic device, the piece of media content from the one of the portable electronic devices of the group.

The common context may be defined by at least one of a common event and a common time period.

The method may further comprise adding meta data to the received piece of media content, the meta data including information about at least one of the one of the portable electronic devices and a portable electronic device having acquired the piece of media content.

The method may further comprising, when joining the group, exchanging an access code within the group, wherein the first portable electronic device is included in the group upon provision of the correct access code.

The piece of media content may comprise any of a photo taken by any of the portable electronic devices of the group, and a video clip recorded by any of the portable electronic devices of the group.

According to a third aspect, there is provided a method for setting up a group of portable electronic devices present at a common context for distributing media content between the portable electronic devices which are enabled for media acquisition and wireless communication. The method comprises generating, by a first portable electronic device, an access code to be provided to possible participants of the group; establishing a wireless connection between the first portable electronic device and another portable electronic device joining the group; requesting via the wireless connection the access code from the another portable electronic device joining the group; receiving a code via the wireless connection from the another portable electronic device joining the group; including the another portable electronic device in the group if the received code coincides with the access code; and enable distribution of the content by any of the portable devices of the group by identifying a piece of media content acquired within the common context and not yet distributed within the group, establishing connection with the portable electronic devices of the group via a wireless communication channel, and transferring the piece of media content to the connected portable electronic devices via the wireless communication channel.

The method may further comprise distributing information to the portable electronic devices of the group including a list of the members of the group.

The method may further comprise excluding one of the portable electronic devices of the group from the group when the one of the portable electronic devices fails to share the common context.

The method may further comprise keeping a record of distributed pieces of media content within the group, the record comprising information, for each piece of media content, which of the portable electronic devices the piece of media content has been distributed to.

According to a fourth aspect, there is provided a computer readable medium comprising program code with instructions arranged to be executed by a processor of a portable electronic device, wherein the instructions cause the portable electronic device to perform the method according to any of the first to third aspects.

According to a fifth aspect, there is provided a portable electronic device enabled for multimedia acquisition and wireless communication, arranged to perform the method according to any of the first to third aspects.

DETAILED DESCRIPTION

For the understanding of the principles of automatic media content sharing, a brief introduction of a scenario will be demonstrated. The technical environment can be a number of portable electronic devices enabled to use Bluetooth, wireless local area network (WLAN), or other local wireless communication technology. The portable electronic devices are of course carried and handled by their users, respectively. The portable electronic devices are assumed to share a common context, e.g. a defined period of time and/or a geographically defined surrounding. A company of friends, i.e. the users, visit a tourist attraction. They will "pair together", i.e. form the group in a technical sense, their portable electronic devices, e.g. mobile phones, so they can share photos or video clips taken by any user, e.g. from 13.00 to 17.00, as long as the company spend time together, and/or are at the tourist attraction, i.e. share a common context. When someone takes a picture or records a video clip among this group of people, it can be automatically distributed to the members of the group.

The group is built by a group of users and their portable electronic devices that will act as "media servers" to the members. One user will initiate the group, and then the other users will attach their portable electronic devices to it, e.g. by Bluetooth pairing, or WLAN associating, preferably with an access code that can be generated by the initiating user and spread to the company of friends. Thus, sharing is only made among the friends, and not to everyone at the tourist attraction. At the end of the visit when the group can be dissolved, and as the friends leave, photos and video clips from the shared moment have been shared. Thus, there is no necessity of asking for copies afterwards and/or sending the pieces of media content, perhaps a long time after the gathering.

Figure 1:
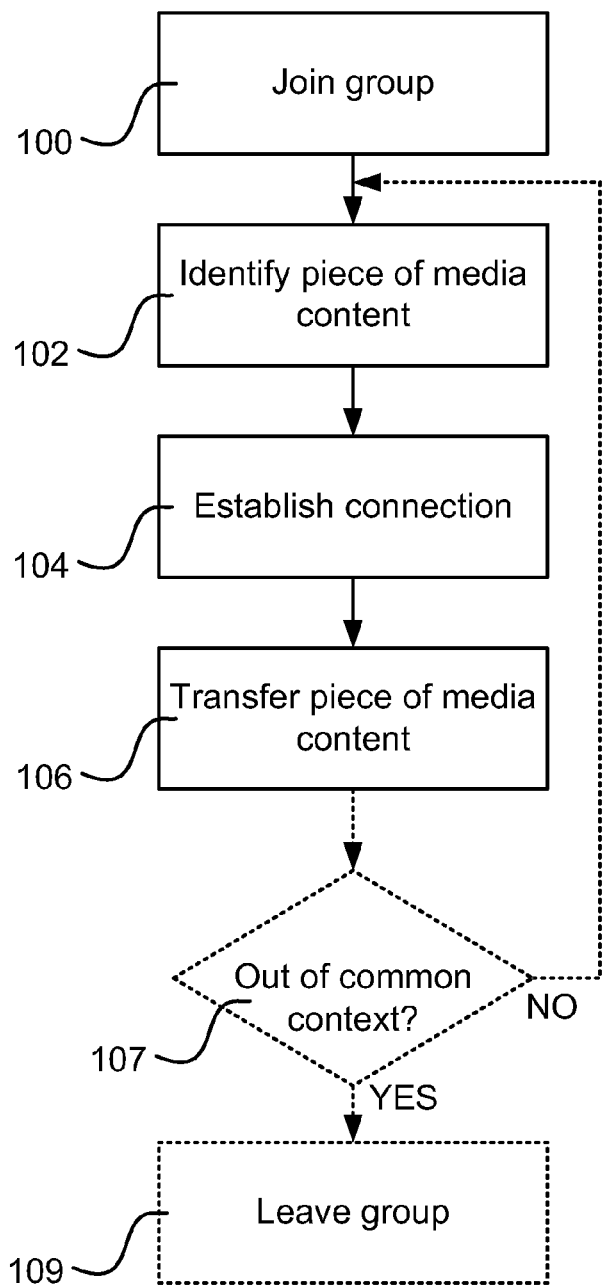
FIG. 1 is a flow chart schematically illustrating a method according to an embodiment.

FIG. 1 is a flow chart schematically illustrating a method according to an embodiment. The method can be considered to be in view of a first portable electronic device which has at least a piece of media content to share. In a group joining step 100, the first portable electronic device joins a group of portable electronic devices.

As demonstrated above, the group can have been initiated by another portable electronic device, and the group is defined by a common context, such as a definition in time and/or space. The definition in space can be given by the ability to communicate directly with at least one of the group members via short-range radio technology, such as Bluetooth, or be connected to a positioning data given by the portable electronic device, e.g. with aid of a global navigation satellite system, and which is compared with a definition of a space criterion for the context, e.g. within a predetermined distance from a coordinate. The user of the first portable electronic device can have received an access code for joining the group, which is given at a handshake procedure at the joining. The first portable electronic device can in the handshake procedure gain information about the other members of the group. The information about the other members of the group can also be distributed during the lifetime of the group, e.g. upon changes of members of the group. When the first portable electronic device has become member of the group, e.g. upon the provision of the correct access code, sharing of media content can start.

The first portable electronic device identifies in a media content identification step 102 a piece of media content, e.g. a captured photograph or a recorded video clip associated with the context of the group and acquired by the first portable electronic device. Here, the term "acquired" means that the first portable electronic device has been used as camera to capture or record the piece of media content. The first portable electronic device can also identify a collected piece of media content that is associated with the context. Here, the term "collected" means that the first portable electronic device has got the piece of media content from another portable electronic device of the group, which can be re-distributed to other members of the group. Thus, a piece of media content for sharing is identified. Here, the criterion that the piece of media content has not yet been distributed to at least some member of the group is preferably set. This can be implemented by meta data of the piece of media content having a field indicating to which members of the group the piece of media content has been distributed to. This field can then be updated upon distribution/re-distribution. Preferably, the meta data also comprises information about the member that captured or recorded the piece of media content.

When the piece of media content has been identified, the first portable electronic device establishes connection with at least one other portable electronic device of the group in a connection establishing step 104. This is done via a wireless communication channel provided by e.g. Bluetooth or WLAN technology.

When the connection is provided, the piece of media content is transferred via the communication channel in a media content transfer step 106. This can be a point-to-point communication or a point-to-multipoint communication.

The sharing operations can be repeated as long as the common context remains, and there is any piece of media content to distribute. If the first portable electronic device finds that the criteria for the common context is no longer fulfilled, as illustrated by checking step 107, the first portable electronic device can leave the group in a leaving step 109. This can for example be that the defined time is up, or the user of the first portable electronic device has left the party etc.

The distribution within the group can be either by only direct transfer of the piece of media content from the originating device, or by a combination of direct transfer and letting the piece of media content propagate through the group by re-distribution. The latter is illustrated in FIG. 2, while the earlier is illustrated in FIG. 3.

Figure 2:
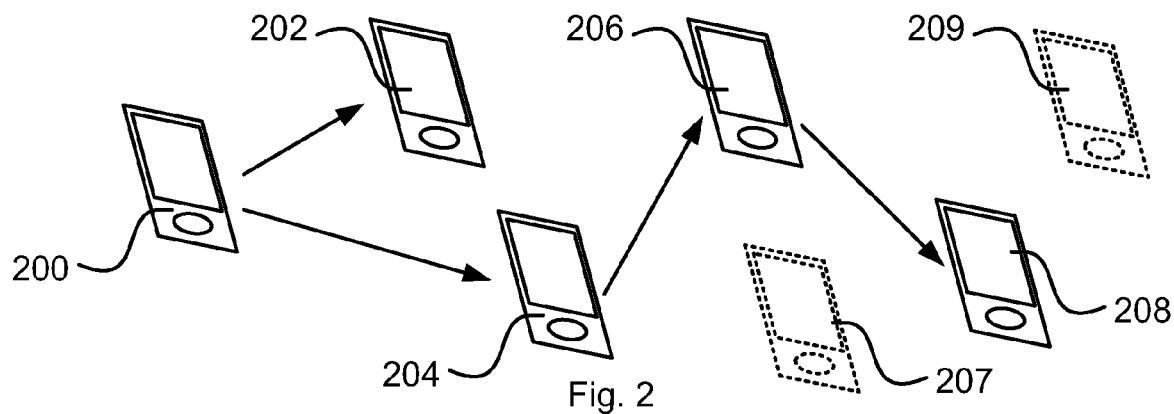
FIG. 2 schematically illustrates an example of sharing of a piece of media content.

FIG. 2 schematically illustrates an example of sharing of a piece of media content. A first portable electronic device 200, which is the originating device of the piece of media content, distributes the piece of media content to a second and a third portable electronic device 202, 204. The third portable electronic device re-distributes the piece of media content to a fourth portable electronic device 206, which in turn re-distributes the piece of media content to a fifth portable electronic device 208. In FIG. 2, a sixth and a seventh portable electronic device 207, 209 are also illustrated. These are illustrated to indicate portable electronic devices that are not part of the group. For example, the sixth portable electronic device 207 can be a device that is not yet part of the group, although its user is part of the company of friends and it shares the common context, while the seventh portable electronic apparatus 209 can be a device that is not part of the group since it does not share the common context since it is too far away from the event or that its user is not part of the company of friends.

Figure 3:
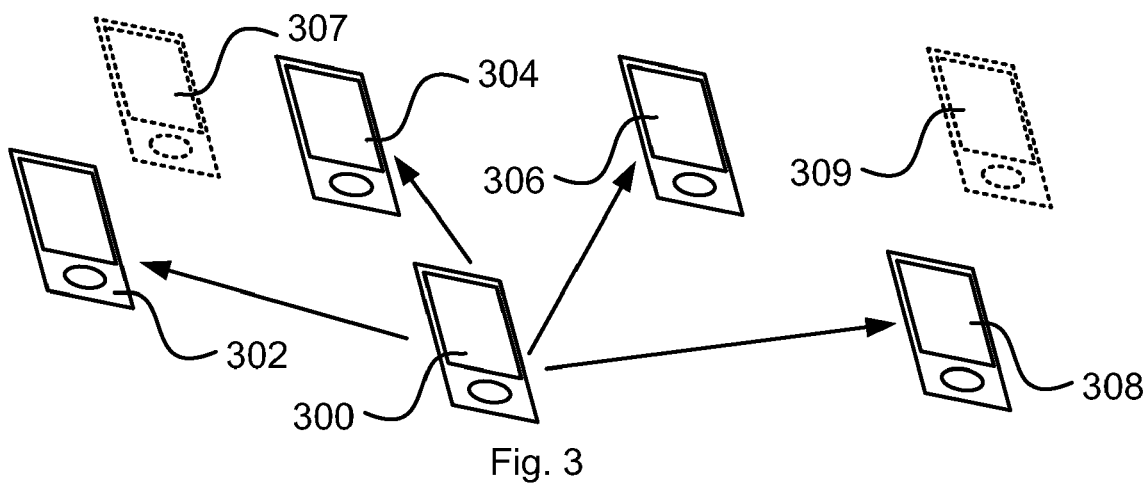
FIG. 3 schematically illustrates an example of sharing of a piece of media content.

FIG. 3 schematically illustrates an example of sharing of a piece of media content. A first portable electronic device 300, which is the originating device of the piece of media content, distributes the piece of media content to a second, third, fourth and a fifth portable electronic device 302, 304, 306, 308. Thus, only direct transfer of the piece of media content is provided. In FIG. 3, a sixth and a seventh portable electronic device 307, 309 are also illustrated. For example, the sixth portable electronic device 307 can be a device that is part of the group, but direct communication is not possible at the moment, while the seventh portable electronic apparatus 309 can be a device that is not part of the group.

Figure 4:
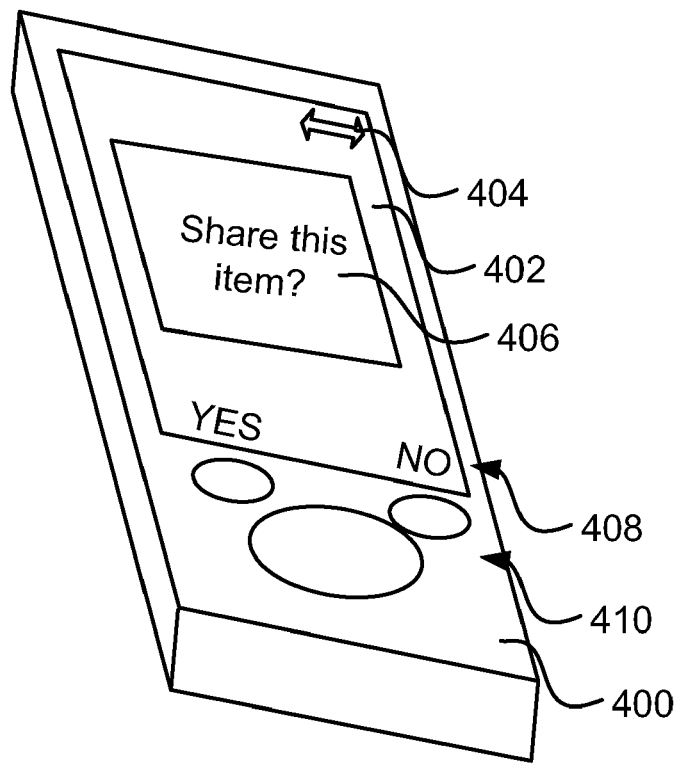
FIG. 4 schematically illustrates a portable electronic device.

From a user's perspective, it can be important to know whether the portable electronic device is about to automatically share acquired media content. Therefore, an indicator for making the user aware of the enabled automatic sharing can be provided. FIG. 4 schematically illustrates a portable electronic device 400 having a display 402 on which such an indication can be presented as a symbol 404. Alternatively or additionally, the sharing awareness can be implemented by providing a question 406 to the user which can be answered, e.g. by soft keys 408 and input means 410, or other responding means, as a piece of media content is about to be shared.

Figure 5:
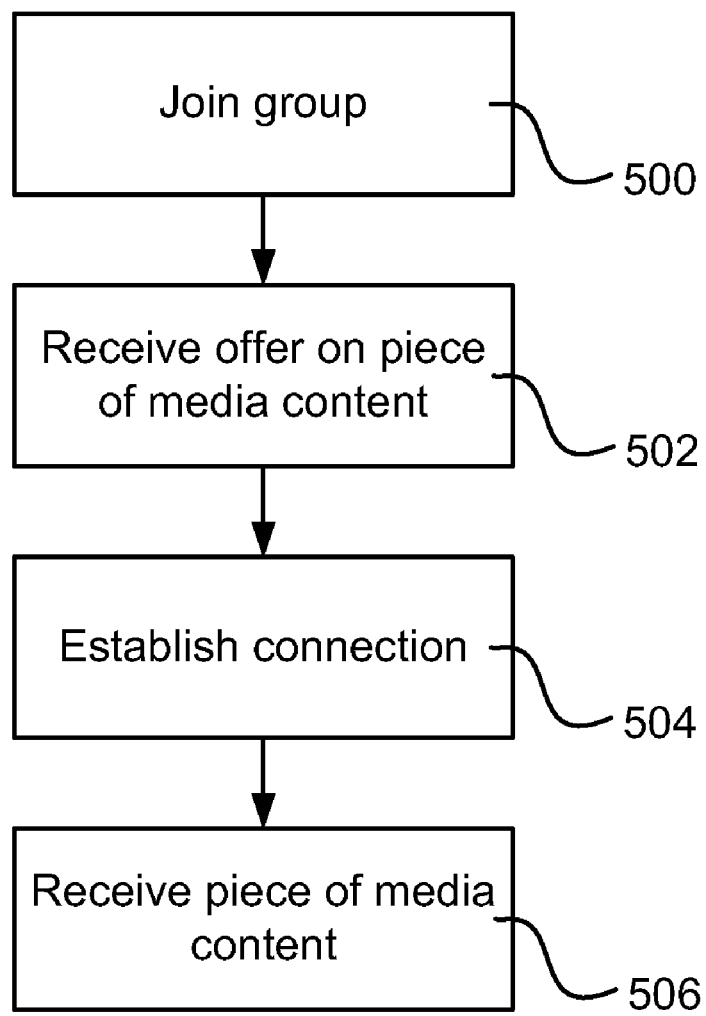
FIG. 5 is a flow chart schematically illustrating a method according to an embodiment.

FIG. 5 is a flow chart schematically illustrating a method according to an embodiment. The method can be considered to be in view of a first portable electronic device which collects a piece of media content from another portable electronic device that has the piece of media content to share. In a group joining step 500, the first portable electronic device joins a group of portable electronic devices. The group can be formed as demonstrated above with reference to FIG. 1, with similar criteria for a common context.

In a media content offer reception step 502, the first portable electronic device receives an offer on a piece of media content from another portable electronic device of the group. This includes a request for establishing a connection over a wireless channel. In a connection establishing step 504, the connection is established, including any handshake operations needed for the wireless channel in question. Then, in a media content reception step 506, the piece of media content is received from the another portable electronic device of the group.

The first portable electronic device can add information to the received piece of media content, e.g. about from whom it was received. The added information can for example be a part of the naming of the file when storing it, or putting the added information as meta data associated with the piece of media content. Alternatively, the information can already be invoked by the sending entity. Information about the originating entity can also have been added in the case the piece of media content is relayed within the group, and the sending entity is not the originating entity. The piece of media content can for example be a picture or a video clip.

Figure 6:
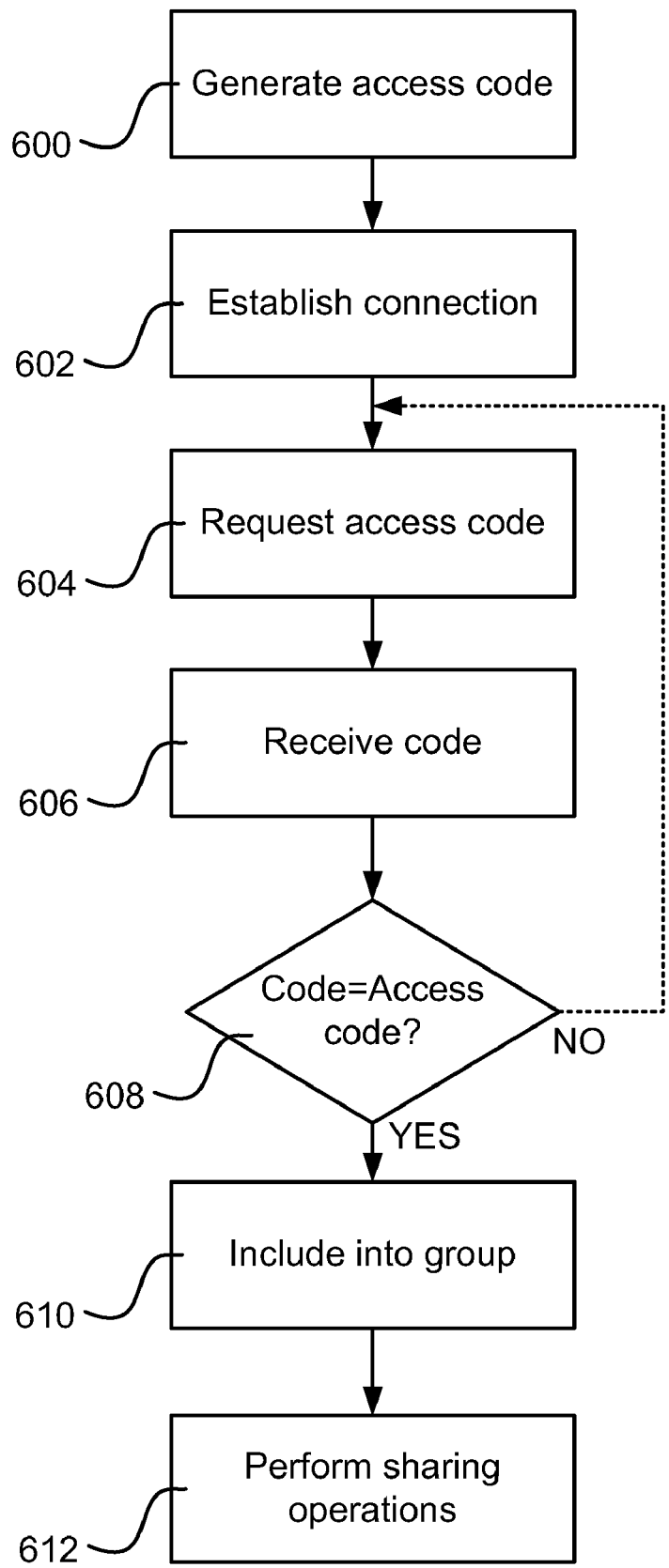
FIG. 6 is a flow chart schematically illustrating a method according to an embodiment.

FIG. 6 is a flow chart schematically illustrating a method according to an embodiment. The method can be considered to be in view of a first portable electronic device which initiates the sharing group. The first portable electronic device can thus define the criteria for a common context. The first portable electronic device can also generate an access code in an access code generation step 600. The access code is given to possible participants of the group, e.g. by telling the users of the other portable wireless devices since they normally are present in vicinity of the user of the first portable electronic device. Alternatively, the access code is sent as a message via some messaging service to the other portable electronic devices. The first portable electronic device then establishes connection via a wireless interface, e.g. by Bluetooth or WLAN technology, to at least one other portable electronic device, which is believed to share the common context and willing to share media content as described above, i.e. to join the group. In a connection establishment step 602, a wireless channel is established with any needed handshake procedure needed for the used wireless technology. In an access code request step 604, an access code for joining the group is requested via the wireless channel. In a code reception step 606, a code is received via the wireless channel from the joining portable electronic device. The code is checked to the generated access code in an access code checking step 608. If the code is incorrect, the connection can be terminated, or the procedure can repeat the access code request step 604 and the code reception step 606 for again checking the new received code against the generated access code in the access code checking step 608. If the code is correct, the another portable electronic device is included in the group in an inclusion step 610. Thereby, the group is formed according to the principles of common context and the sharing operations, as described above, can be performed, as illustrated by a sharing operations performing step 612.

Figure 7:
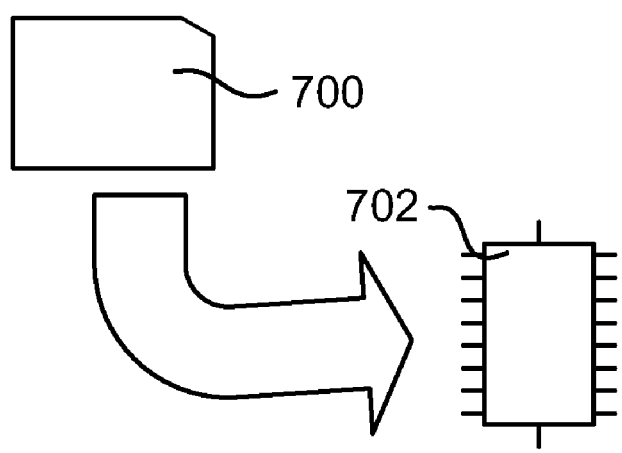
FIG. 7 is a schematic illustration of a computer readable medium and processing means or processor of the portable electronic device.

The methods according to the present invention are suitable for implementation with aid of processing means, such as computers and/or processors of the portable electronic devices. Therefore, there is provided computer programs, comprising instructions arranged to cause the processing means or processor of the portable electronic device to perform the steps of any of the methods according to any of the embodiments described with reference to any of FIGS. 1, 5 and 6. The computer programs preferably comprise program code which is stored on a computer readable medium 700, as illustrated in FIG. 7, which can be loaded and executed by a processing means or processor 702 of the portable electronic device to cause it to perform the methods, respectively, according to embodiments of the present invention, preferably as any of the embodiments described with reference to any of FIGS. 1, 5 and 6. The processor 702 and computer program product 700 can be arranged to execute the program code sequentially where actions of the any of the methods are performed stepwise, but can also be arranged to perform the actions on a real-time basis, i.e. actions are performed upon request and/or available input data. The processing means or processor 702 is preferably what normally is referred to as an embedded system. Thus, the depicted computer readable medium 700 and processor 702 in FIG. 7 should be construed to be for illustrative purposes only to provide understanding of the principle, and not to be construed as any direct illustration of the elements.

The method can use a software program that checks for new photos in the designated catalogue. When it discovers a new photo or video clip, or a certain number of new photos or video clips, it gets in contact with the other "member" devices to enable transferring. The transfer can use standard techniques for binary files.

The same software program can accept connections and the transfer of photos or video clips from other members. These photos can be tagged in a way, such that it is able to recognize that they come from another camera, perhaps containing the device name in the file name of the photo or video clip transferred, or being included in meta data associated with the piece of media content.

At the same time, the software can keep track of what pieces of media content that have been transferred, and see to that all pieces of media content get transferred, even involving certain devices acting as relay stations to facilitate this, having in mind that e.g. Bluetooth coverage is good enough for only some metres of distance.

Thus, one or more of the following features can be included:
  Tag captured images or video clips for sharing
  Define sharing rules: time period, degree of effort to find/distribute image or video clip, sharing group, based on geoinformation or other proximity criterion
  Awareness of sharing: symbol present, question asked for (each) picture or video clip
  Sharing matrix: keep track on which image or video clip is distributed to whom, matrix at receiver (for single node and multinode distribution) or sender (for single node distribution), propagation strategies for multinode distribution according to known technology, as e.g. described in e.g. WO 2008/085133, which is hereby incorporated by reference The portable electronic device can be a mobile phone with camera capabilities or a camera with wireless communication capabilities. The wireless capabilities that can be used are for example Bluetooth Wireless Technology or any of the Wireless Local Area Network technologies present today. These technologies can be arranged to work according to an ad hoc approach.

Figure 8:
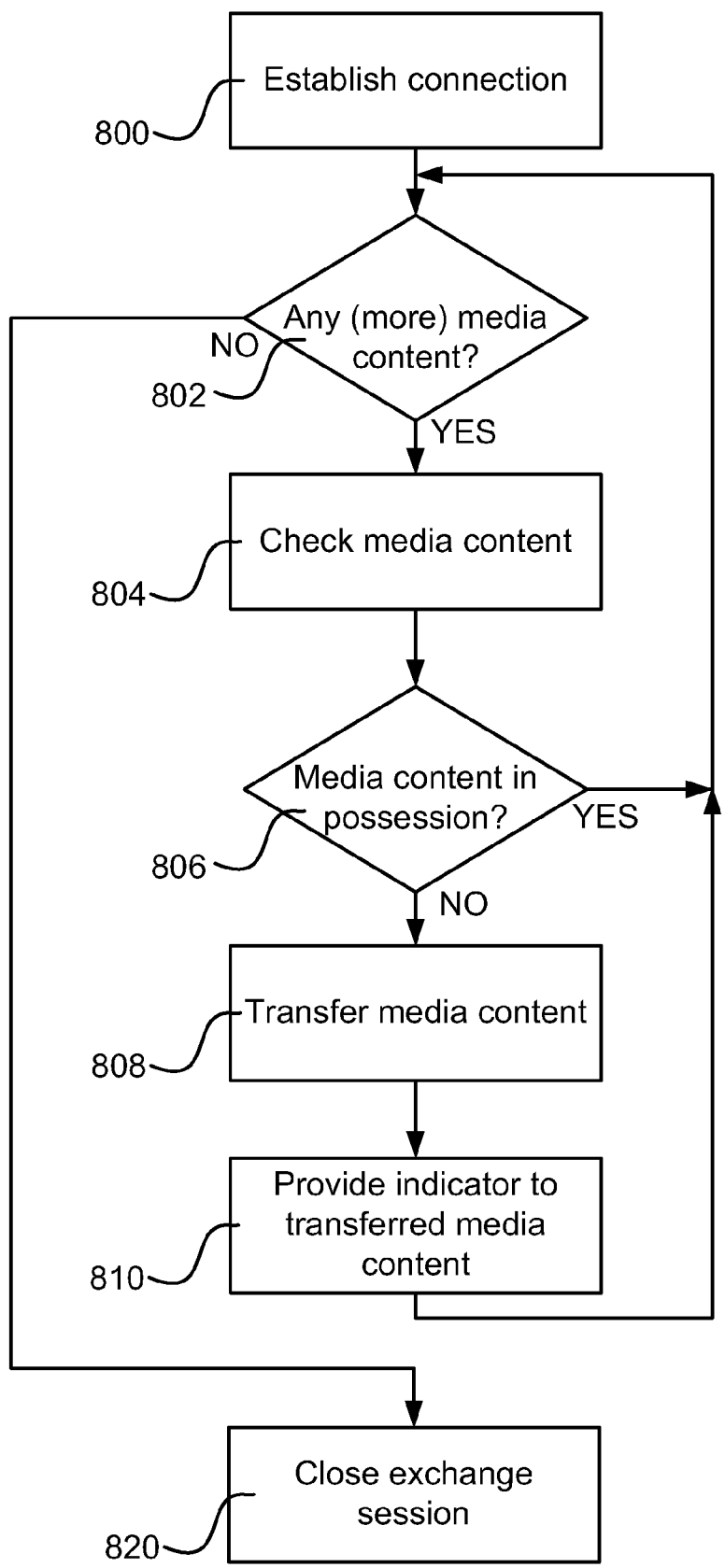
FIG. 8 is a flow chart schematically illustrating an example of exchanging media content.

FIG. 8 illustrates an example of exchange of media content in view of two peer terminals, i.e. portable electronic devices. In a connection establishing step 800, a connection is established from a first terminal to a peer second terminal. Here, the term 'peer' indicates that no hierarchy is present between the involved terminals, and the connection is therefore preferably established according to an ad hoc procedure.

In a media content presence checking step 802 it is checked if there are any (more) media content present on the second terminal. If there is no media (more) content, the procedure continues to a connection closing step 820 where the connection between the first and second terminals is disconnected and the exchanging session is closed. If there is any (more) media content present on the second terminal, the procedure instead continues with a media content checking step 804, where for example meta data for the media content is sent to the first terminal. The first terminal can thus check if it is already in possession of the media content in a media content possession checking step 806. If the first terminal determines that the media content in question is already in possession of the first terminal, the procedure returns to the media content presence checking step 802, where it is checked if there are any more media content present on the second terminal; therefore the expression within parentheses "(more)" in the demonstrated procedure above. If the first terminal determines that the media content in not yet in possession of the first terminal, the procedure proceeds to a media content transmission step 808 where the media content is transmitted from the second terminal to the first terminal.

In a transmitted media content tracking step 810, the media content is given an indicator, e.g. in associated meta data, that the media content has been transmitted to the first terminal. The procedure then returns to the media content presence checking step 802, where it is checked if there are any more media content present on the second terminal. The procedure continues in this way until there is no more media content present, as is checked in the media content presence checking step 802, and when no more media content is present, the procedure continues to a connection closing step 820 where the connection between the first and second terminals is disconnected and the exchanging session is closed.

The invention claimed is:

1. A method for distributing media content between portable electronic devices enabled for media acquisition and wireless communication, the method comprising
   joining, by a first portable electronic device, a group of the portable electronic devices being present at a common context;
   identifying a piece of media content acquired by the first portable electronic device within the common context and not yet distributed within the group;
   establishing a connection between the first portable electronic device and at least one other portable electronic device of the portable electronic devices of the group via a wireless communication channel;
   transferring the piece of media content via the connection to the at least one other portable electronic device of the portable electronic devices of the group; and
   defining a set of distribution effort criteria comprising at least one distribution effort criterion including any of a group comprising:
      a maximum time period until successful distribution to distribute to a receiving party among the portable electronic devices of the group,
      a maximum proximity value to a receiving party among the portable electronic devices of the group defined by number of relaying steps,
      a maximum proximity value to a receiving party among the portable electronic devices of the group based on geographical information, and
      a maximum number of attempts until successful distribution to distribute to a receiving party among the portable electronic devices of the group,
   wherein distribution efforts are ended if the distribution effort criteria set is exceeded.

2. The method according to claim 1, wherein the common context is defined by at least one of a common event and a common time period.

3. The method according to claim 1, further comprising, excluding one of the portable electronic device of the group from the group when that portable electronic device fails to share the common context.

4. The method according to claim 1, further comprising, when joining the group, exchanging an access code within the group, wherein the first portable electronic device is included in the group upon provision of the correct access code.

5. The method according to claim 1, wherein the piece of media content comprises any of a photo taken by the first portable electronic device and a video clip recorded by the first portable electronic device.

6. The method according to claim 1, wherein the identifying of the piece of media content further comprises identifying a piece of media content collected by the first portable electronic device from another portable electronic apparatus of the group such that the collected piece of media content is re-distributed within the group by the establishing of a connection and the transferring.

7. The method according to claim 1, wherein establishing of the connection comprises any of direct wireless contact to at least one of the portable electronic devices of the group and relaying within the portable electronic devices of the group.

8. The method according to claim 1, wherein the establishing of the connection comprises only direct wireless contact to the portable electronic devices of the group.

9. The method according to claim 1, further comprising holding an information field associated with each piece of media content, the information field comprising information on which of the portable devices of the group the piece of media content has been distributed to.

10. The method according to claim 1, wherein distribution efforts are ended if one of the at least one distribution effort criterion of the distribution effort criteria set is exceeded.

11. The method according to claim 1, further comprising providing a sharing awareness indication to a user of the first portable electronic device.

12. The method according to claim 11, wherein the sharing awareness indication includes a symbol presented on a display of the first portable electronic device.

13. The method according to claim 11, wherein the sharing awareness indication includes providing a question to the user of the first portable electronic device whether a piece of media content should be shared, and if a received answer is affirmative, sharing the piece of media content, or if the received answer is negative, excluding the piece of media content from sharing.

14. A method for collecting media content among portable electronic devices being present at a common context and being enabled for multimedia acquisition and wireless communication, the method comprising
   joining, by a first portable electronic device, the group of the portable electronic devices;
   receiving, by the first portable electronic device, a request for connection from one of the portable electronic devices of the group, the request being related to offering a piece of media content;
   establishing the connection between the first portable electronic device and the one of the portable electronic devices of the portable electronic devices of the group via a wireless communication channel;
   receiving, by the first portable electronic device, the piece of media content from the one of the portable electronic devices of the group; and
   defining a set of distribution effort criteria comprising at least one distribution effort criterion including any of a group comprising:
      a maximum time period until successful distribution to distribute to a receiving party among the portable electronic devices of the group,
      a maximum proximity value to a receiving party among the portable electronic devices of the group defined by number of relaying steps,
      a maximum proximity value to a receiving party among the portable electronic devices of the group based on geographical information, and
      a maximum number of attempts until successful distribution to distribute to a receiving party among the portable electronic devices of the group,
   wherein distribution efforts are ended if the distribution effort criteria set is exceeded.

15. The method according to claim 14, wherein the common context is defined by at least one of a common event and a common time period.

16. The method according to claim 14, further comprising adding meta data to the received piece of media content, the meta data including information about at least one of the portable electronic devices and a portable electronic device having acquired the piece of media content.

17. The method according to claim 14, further comprising, when joining the group, exchanging an access code within the group, wherein the first portable electronic device is included in the group upon provision of the correct access code.

18. The method according to claim 14, wherein the piece of media content comprises any of a photo taken by any of the portable electronic devices of the group, and a video clip recorded by any of the portable electronic devices of the group.

19. A method for setting up a group of portable electronic devices present at a common context for distributing media content between the portable electronic devices which are enabled for media acquisition and wireless communication, the method comprising generating, by a first portable electronic device, an access code to be provided to possible participants of the group;

establishing a wireless connection between the first portable electronic device and another portable electronic device joining the group;

requesting via the wireless connection the access code from the another portable electronic device joining the group;

receiving a code via the wireless connection from the another portable electronic device joining the group;

including the another portable electronic device in the group if the received code coincides with the access code;

enable distribution of the content by any of the portable devices of the group by identifying a piece of media content acquired within the common context and not yet distributed within the group, establishing connection with the portable electronic devices of the group via a wireless communication channel, and transferring the piece of media content to the connected portable electronic devices via the wireless communication channel; and defining a set of distribution effort criteria comprising at least one distribution effort criterion including any of a group comprising:

a maximum time period until successful distribution to distribute to a receiving party among the portable electronic devices of the group, a maximum proximity value to a receiving party among the portable electronic devices of the group defined by number of relaying steps, a maximum proximity value to a receiving party among the portable electronic devices of the group based on geographical information, and a maximum number of attempts until successful distribution to distribute to a receiving party among the portable electronic devices of the group, wherein distribution efforts are ended if the distribution effort criteria set is exceeded.

20. The method according to claim 19, further comprising distributing information to the portable electronic devices of the group including a list of the members of the group.

21. The method according to claim 19, further comprising excluding one of the portable electronic devices of the group from the group when the one of the portable electronic devices fails to share the common context.

22. The method according to claim 19, further comprising keeping a record of distributed pieces of media content within the group, the record comprising information, for each piece of media content, which of the portable electronic devices the piece of media content has been distributed to.

23. A computer readable medium comprising program code with instructions arranged to be executed by a processor of a portable electronic device, wherein the instructions cause the portable electronic device to perform the method according to claim 1.

24. A portable electronic device enabled for multimedia acquisition and wireless communication, arranged to perform the method according to claim 1.

* * * * *